United States Patent
Xiao et al.

(10) Patent No.: US 6,303,716 B1
(45) Date of Patent: Oct. 16, 2001

(54) HIGH-ACTIVITY CATALYST FOR PRODUCING LOW-, MEDIUM- AND HIGH DENSITY POLYETHYLENES BY GAS PHASE POLYMERIZATION, PROCESS FOR PREPARING THE SAME AND USE OF THE SAME IN ETHYLENE POLYMERIZATION

(75) Inventors: Mingwei Xiao; Zixiao Chai; Xiaofeng Ye, all of Shanghai (CN)

(73) Assignees: China Retrochemical Corp., Beijing; Shanghai Research Institute of Chemical Industry Sinopec Unila, Shanghai, both of (CN)

( * ) Notice: Subject to any disclaimer, the term of this patent is extended or adjusted under 35 U.S.C. 154(b) by 0 days.

(21) Appl. No.: 09/353,046

(22) Filed: Jul. 13, 1999

(51) Int. Cl.$^7$ .......................................................... C08F 4/02
(52) U.S. Cl. ...................... 526/129; 526/348; 526/125.1; 526/158; 526/124.3; 526/124.2; 526/124.1; 502/115; 502/227; 502/233; 502/250
(58) Field of Search .................................. 526/129, 124.1, 526/124.2, 124.3, 158, 125.1, 348; 502/115, 227, 233, 250

(56) References Cited

U.S. PATENT DOCUMENTS

| | | |
|---|---|---|
| 4,302,565 | 11/1981 | Goeke et al. . |
| 4,349,648 | 9/1982 | Jorgensen et al. . |
| 4,438,019 | 3/1984 | Durand et al. . |
| 4,497,904 | 2/1985 | Blaya et al. . |
| 4,894,424 | 1/1990 | Lassalle . |
| 5,258,345 | * 11/1993 | Kissin et al. ........................ 502/116 |
| 5,885,924 | * 3/1999 | Ward ................................... 502/402 |

FOREIGN PATENT DOCUMENTS 93112345.3  *  6/1995  (CN) .

* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

Disclosed is a catalyst for synthesizing low-, medium- and high-density polyethylene, prepared by using commercial powdered magnesium as a raw material, forming a magnesium halide in the nascent state, then reacting said magnesium halide with a titanium compound and an alkyl aluminum compound in the presence of an electron donor compound to form a complex, supporting said complex onto silica carrier and drying the resulting mixture by heating to form a solid main catalyst component, and finally mixing said main catalyst component with an organometallic compound as cocatalyst. The catalyst according to the present invention is characterized by a simple preparing procedure, smooth and stable reaction, uniform heat liberation and less agglomerates when used for gas phase polymerizing ethylene, high polymerization activity, high sensitivity to the modification by hydrogen and high copolymerization power, and the products thus obtained have good product morphology.

23 Claims, No Drawings

HIGH-ACTIVITY CATALYST FOR PRODUCING LOW-, MEDIUM- AND HIGH DENSITY POLYETHYLENES BY GAS PHASE POLYMERIZATION, PROCESS FOR PREPARING THE SAME AND USE OF THE SAME IN ETHYLENE POLYMERIZATION

FIELD OF THE INVENTION

The present invention relates to a high-activity solid catalyst suitable for gas phase polymerization of ethylene, a process for preparing the same and use of the same in ethylene polymerization.

BACKGROUND OF THE INVENTION

Since the successful development of high-activity catalysts for polyethylene in 1970's, there has been rapid progress with respect to the researches into the catalysts for ethylene polymerization and three systems in terms of the composition of the catalysts, i.e. chromium type high-activity catalysts, Ziegler-Natta type high-activity catalysts and metallocene type high-activity catalysts, have been formed. Among them, Ziegler-Natta type high-activity catalysts are very important in the field of catalysts for their excellent performance and the processes for preparing them have been developed from the grinding process as well as the suspending-impregnating process utilized in the early stages to the chemical reaction process utilized at present. Processes for producing polyethylenes are continuously renewed and among them, the gas phase process for synthesizing polyethylenes are being widely utilized for low investment to equipment, low energy consumption, excellent product performance and high economical benefits. Recently, exploitation of various novel catalysts makes the gas phase process develop rapidly, and there are many patents issued with respect to the processes for preparing such catalysts.

For example, U.S. Pat. No. 4,497,904 discloses a catalyst which has a narrow particle size distribution and is very suitable for the gas phase polymerization process, prepared by reacting butyloctyl magnesium as raw material with butyl chloride to form a spherical magnesium chloride as a carrier of the catalyst, and then reacting a halide containing titanium with said carrier. The catalyst is disadvantageous in that dialkyl magnesium as raw material is expensive, which results in high cost. It is described in U.S. Pat. No. 4,438,019 that powdered magnesium, titanium tetrachloride, propyl titanate and butyl chloride are reacted to obtain a catalyst for polymerizing olefins; though said catalyst has high initial activity, it gives rise to the appearance of hot spots during the polymerization and the formation of agglomerates of molten polyethylene, or fragmentation of the catalyst particles; moreover, said catalyst must be oxidized from $Ti^{3+}$ to $Ti^{4+}$ prior to use. To overcome the disadvantage, U.S. Pat. No. 4,894,424 describes that an appropriate amount of water is added during the preparation of the catalyst to inactivate it, reduce the initial polymerization reaction rate and prevent the appearance of hot spots. However, the preparation of such a catalyst is too complicated and the amount of water to be added should be strictly controlled so as to inactivate the catalyst.

U.S. Pat. Nos. 4,349,648 and 4,302,565 disclose catalysts for gas phase polymerizing ethylene, prepared by reacting anhydrous magnesium chloride with tetrahydrofluran and titanium tetrachloride to form a complex, then impregnating said complex onto silica gel as carrier, followed by drying the resulting product to form a main catalyst component having good flowability and finally activating said component with an alkyl aluminum compound. Such catalysts has very high initial activity, giving rise to the appearance of hot spots and the formation of agglomerates of polyethylene, and the resulting polyethylenes have low and medium densities (from 0.91 to 0.94 $g/cm^3$).

In order to overcome the above disadvantages, the present inventors proposed a catalyst in Chinese Patent Application No. 93112345.3, which is prepared by using powdered magnesium as raw material to form a complexed magnesium halide carrier having reducing capability and then supporting active components onto said carrier by impregnating, with more than 80% of titanium being trivalent. Said catalyst is advantageous for a simple preparing procedure, low initial activity of polymerization reaction, smooth and stable reaction, high catalytic activity, good morphology of the resulting polymer particles and lack of fine particles. However, said catalyst must be subjected to prepolymerization so as to be readily fed into the fluidized bed and thus there is a room for improvement.

SUMMARY OF THE INVENTION

In view of the above, the present inventors conducted extensive and intensive research with a view to obtain a novel catalyst for gas phase polymerizing ethylene. As a result, it is found that a novel catalyst for polymerizing ethylene can be prepared by using commercial powdered magnesium as raw material, forming a magnesium halide in the nascent state, then reacting said magnesium halide with a titanium compound and an alkyl aluminum compound in the presence of an electron donor compound to form a complex, supporting said complex onto silica carrier and drying the resulting mixture by heating to form a solid main catalyst component, and finally mixing said main catalyst component with an organometallic compound as cocatalyst. The catalyst according to the present invention is characterized by a simple preparing procedure, smooth and stable reaction, uniform heat liberation and less agglomerates when used for gas phase polymerizing ethylene, high polymerization activity, high sensitivity to the modification by hydrogen and high copolymerization power, and low-, medium-and high-density polyethylene products can be obtained by using the catalyst and the products thus obtained have good particle morphology.

Therefore, an object of the present invention is to provide a high activity solid catalyst suitable for gas phase polymerizing ethylene, which is free of the above disadvantages associated with the prior catalysts and can be readily fed into the fluidized bed without prepolymerization.

Another object of the present invention is to provide a process for preparing the catalyst according to the present invention.

Still another object of the present invention is to provide a process for gas phase polymerizing ethylene.

These and other objects, features and advantages of the present invention will be apparent to those skilled in the art from the following detailed description taken in connection with the appended claims.

DETAILED DESCRIPTION OF THE INVENTION

The present invention in its one aspect provides a high activity solid catalyst for gas phase polymerizing ethylene, comprising A) a solid main catalyst component containing titanium, prepared by reacting commercial powdered magnesium with an alkyl halide in a hydrocarbon solvent to form a magnesium halide in the nascent state, then reacting said magnesium halide with a titanium compound and an alkyl aluminum compound in the presence of an electron donor compound and finally supporting the resulting complex onto a silica carrier, wherein said electron donor compound is an organic compound containing at least one atom of oxygen, sulfur, nitrogen, silicon or phosphorus; and B) an organometallic compound as cocatalyst; wherein the ratio of the cocatalyst to the main catalyst component, in terms of the molar ratio of the metal contained in component B) to titanium contained in component A), is (30–300):1.

The present invention in its another aspect provides a process for preparing the catalyst according to the present invention.

The present invention in its third aspect provides a process for gas phase polymerizing ethylene.

The preparation procedure for the catalyst according to the present invention is described as follows.

(1) Treatment of Silica Carrier

Silica carrier used in the present invention is preferably subjected to a treatment in the following manner. Silica is treated by heating in a fluidized bed through which a carrier gas such as air, nitrogen or argon is passed. The conditions for the treatment are such that the temperature is controlled at 500–800° C., preferably 600–700° C. and the treatment time is from 2 to 12 hours, preferably from 3 to 10 hours. The treated silica is then removed for further reaction.

The silica treated as above may be further treated. For example, the silica treated as above may be mixed with a hydrocarbon solvent under stirring to form a slurry; to the slurry is added an alkyl aluminum compound such that the weight ratio of aluminum contained in the alkyl aluminum compound to $SiO_2$ is 0.01–10:1, preferably 0.02–8:1, and then the mixture is stirred for 0.5 to 4 hours at room temperature; the solvent is removed by drying to form silica carrier having excellent fluidity.

The alkyl aluminum compound used in the treatment of silica may be triethyl aluminum, triisopropyl aluminum, triisobutyl aluminum, tri-n-octyl aluminum or tri-(2-ethyl) hexyl aluminum. The hydrocarbon solvent used in the treatment of silica may be aliphatic hydrocarbons, cycloaliphatic hydrocarbons or aromatic hydrocarbons, such as n-pentane, isopentane, n-hexane, n-octane, cyclopentane, cyclohexane, benzene or 1,2-dichloroethane, preferably aliphatic hydrocarbons containing from 5 to 10 carbon atoms.

(2) Preparation of Magnesium Halide in the Nascent State

Under an atmosphere of nitrogen, commercial powdered magnesium is reacted with an alkyl halide(RX) in a hydrocarbon solvent at a temperature of 10–100° C., preferably 20–80° C., for 0.5–10 hours, preferably 1–8 hours, to obtain a magnesium halide in the nascent state. The magnesium halide is then washed several times by clean hydrocarbon solvent and dried to form a solid for further reaction. The alkyl halide(RX) is used in such an amount that the molar ratio of RX to Mg is from 1.6 to 2.4, preferably from 1.8 to 2.0.

An certain amount of alkyl aluminum halide(RMgX) may be contained in the magnesium halide in the nascent state and thus the latter has a structure represented by the following formula:

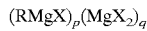

wherein p:q is 0–1.0:1.0(by mole), preferably 0.05–0.8:1.0 (by mole), R is an alkyl group containing from 3 to 12 carbon atoms and X is halogen, preferably chlorine.

The hydrocarbon solvent used in the preparation of magnesium halide in the nascent state may be aliphatic hydrocarbons, cycloaliphatic hydrocarbons or aromatic hydrocarbons, such as n-pentane, isopentane, n-hexane, n-octane, cyclopentane, cyclohexane, benzene or 1,2-dichloroethane, preferably aliphatic hydrocarbons containing from 5 to 10 carbon atoms.

The alkyl halide(RX) used in the preparation of magnesium halide in the nascent state may be n-propyl chloride, n-butyl chloride, isobutyl chloride, isopentyl chloride and the like.

(3) Preparation of the Main Catalyst Component Containing Titanium

The magnesium halide in the nascent state as prepared in the above (2) is dissolved in an electron donor compound. To the resulting solution are added a titanium compound and an alkyl aluminum compound with stirring and then the resulting mixture is reacted at a temperature of 20–80° C. for 0.5–10 hours, preferably 1–8 hours, to form a complex. The proportions of the reactants are such that the molar ratio of the alkyl aluminum compound: the titanium compound: the magnesium halide in the nascent state is (0.5–5.0): 1:(2.0–10). Upon the completion of the reaction, the silica carrier as prepared in the above (1) is added into the resulting complex and the mixture is reacted with stirring at a temperature of 20–80° C., preferably 30–70° C., for 0.5–8 hours, preferably 0.5–4 hours. Finally, the electron donor compound as solvent is removed by drying at 75° C. to obtain a main catalyst component which contains the electron donor compound in an amount of 2 to 30% by weight of the main catalyst component, preferably 5 to 25% by weight of the main catalyst component. The silica is used in such an amount that the weight ratio of $SiO_2$ to the resulting complex is 1:0.2–2.0.

The composition of the main catalyst component is such that the molar ratio of Ti:Mg:X is 1:(2.0–10.0):(4.0–20).

The electron donor compound used in the above reaction is an organic compound containing at least one atom of oxygen, sulfur, nitrogen, silicon or phosphorus and it must be liquid at room temperature. Suitable examples of the electron donor compound may include aliphatic or aromatic ethers, esters, amines, alcohols etc., each containing from 3 to 8 carbon atoms, such as diethyl ether, tetrahydrofuran, ethyl acetate, ethyl benzoate, tributyl phosphate, isobutanol or N, N-dimethylformamide. The above electron donor compounds can be used individually or in combinations thereof.

The alkyl aluminum compound used in the above reaction may be triethyl aluminum, triisopropyl aluminum, triisobutyl aluminum, tri-n-octyl aluminum, tri(2-ethyl)hexyl aluminum, diethyl aluminum chloride, ethyl aluminum dichloride, diisopropyl aluminum chloride, ethyl aluminum sesquichloride or butyl aluminum sesquichloride.

The titanium compound used in the above reaction may be a compound represented by the following formula:

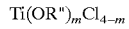

wherein R" is an alkyl group containing 3 or 4 carbon atoms and m is an integer of from 0 to 4; and the specific examples thereof may be titanium tetrachloride, butyl titanate, methoxy titanium trichloride, butoxy titanium trichloride and the like.

(4) Activation of the Main Catalyst Component:

The main catalyst component as prepared in the above (3) must be completely activated by an appropriate amount of a cocatalyst prior to use in gas phase polymerization of ethylene and the high activity catalyst for polyethylenes according to the present invention is consisted of the main catalyst component and the cocatalyst. The cocatalyst may be an organometallic compound selected from the group consisting of organic zinc compounds, organic magnesium compounds, organic aluminum compounds or the mixtures thereof, with organic aluminum compounds, such as triethyl aluminum, diethyl aluminum chloride, triisobutyl aluminum, tri-n-hexyl aluminum and the like, being preferred. The cocatalyst is used in such an amount that the molar ratio of the metal atom contained in the cocatalyst to titanium contained in the main catalyst component is 30–300:1, preferably 50–250:1. The high activity catalyst for polyethylenes thus obtained can be directly used for gas phase polymerizing ethylene.

Prior to complete activation, the main catalyst component can be pre-activated by a portion of cocatalyst. Upon pre-activation, the cocatalyst is used in such an amount that the molar ratio of the metal atom contained in the cocatalyst to titanium contained in the main catalyst component is 1–10:1, preferably 2–5:1. The pre-activation is carried out by stirring the mixture at a temperature of 20–100° C. for 0.5–2 hours, preferably at a temperature of 30–80° C. for 0.5–1 hour.

The high activity catalyst according to the present invention can be directly used for gas phase polymerizing ethylene at a temperature of 80–115° C., preferably 90–100° C. and at a pressure of 1.0 to 2.0 MPa.

The term "ethylene polymerization", as used herein, means ethylene homopolymerization and ethylene copolymerization with other comonomers. For example, for producing low-density polyethylenes, a comonomer is usually used to regulate The density of the product. The comonomers usually utilized may be aliphatic α-olefins containing from 3 to 8 carbon atoms. Suitable examples of the α-olefins are propylene, butene-1, pentene-1, hexene-1,4-methylpentene-1, heptene-1or octene-1, preferably butene-1 or hexene-1. The polyethylene products obtained by incorporating such a comonomer can have a density ranging from 0.910 to 0.960 9/cm³.

A chain transfer agent such as hydrogen can be used during the polymerization or diethyl zinc may be added into the catalyst according to the present invention, so as to regulate the melt index of the polyethylenes. The partial pressure of hydrogen may be regulated in a range of from 10% to 50% so that the polyethylene products having a melt index $MI_{2.16}$ ranging from 0 to 60 g/10 minutes can be obtained.

The high activity solid catalyst for polyethylenes according to the present invention has high polymerization activity, usually from 4000 to 10000 g polyethylene/g catalyst(at a polymerization pressure of 2.0 MPa). The polymerization reaction is smooth and stable, and easy to operate.

The high activity solid catalyst for polyethylenes according to the present invention possesses the following advantages:

1. The catalyst can be prepared in a simple manner and is completely suitable for production and application in an industrial scale.

2. When used for polymerizing ethylene, the catalyst according to the present invention has high polymerization activity and gives rise to uniform heat liberation and less agglomerate due to the presence of magnesium halide in the nascent state.

3. The catalyst according to the present invention has good copolymerization power and good sensitivity to the modification by hydrogen and the polyethylene products obtained contain less fine particles.

The following examples are used to illustrate the present invention and by no means intended to limit the scope thereof.

EXAMPLE 1

A. Treatment of Silica Carrier 80 g of silica is treated in a fluidized bed by heating to a temperature of 700° C. for 8 hours, with air being the carrier gas. Then it is cooled to room temperature to form silica carrier having excellent fluidity and is stored for further reaction.

B. Preparation of Main Catalyst Component (1) Into a 500 ml glass reaction vessel provided with a stirrer, a condenser, a dropping funnel and means for heating are charged 150 ml of n-hexane and 3 g of powdered magnesium. To the resulting mixture is then slowly added 35 ml of n-butyl chloride while stirring at 20° C. Upon completion of addition, the mixture is heated to a temperature of 40° C. and maintained for 12 hours and a black suspension of solid magnesium chloride in the nascent state is formed. The magnesium chloride thus obtained has a structure represented by $MgCl_2(MgBuCl)_{0.3}$. A solid magnesium chloride in the nascent state is then obtained by removal of n-hexane.

(2) Into a reaction vessel, 300 ml tetrahydrofuran, the solid magnesium chloride as prepared in the step (1), 1 ml of triethyl aluminum and 3.9 ml of titanium tetrachloride are charged and the resulting mixture is heated to a temperature of 70° C. while stirring.

(3) Into the reaction solution as prepared in step (2), the silica carrier as prepared in step A. is charged. The resulting mixture is stirred at 75° C. for 2 hours and then tetrahydrofaran is evaporated. During the evaporation, the solid component is sampled for analysis and the evaporation is stopped when the residual amount of tetrahydrofluran in said solid is 5%. To the resulting main catalyst component, 800 ml of n-hexane, 10.6 ml of diethyl aluminum chloride and 21.9 ml of triethyl aluminum are then charged and the resulting mixture is stirred at 75° C. for 1 hour. After removal of hexane, a solid main catalyst component subjected to pre-activation is formed.

C. Polymerization

The polymerization reaction is carried out in a fluidized bed having a diameter of 100 mm and a height of 1500 mm. First, 100 g of an oven-dried base of particulate polyethylene, 0.8 ml of triethyl aluminum as cocatalyst and 0.116 g of the main catalyst component as pre-activated above are charged into the fluidized bed reactor. The mixture is reacted at a total pressure of 1.0 MPa, with the composition of the feed gas being ethylene 61.4%, $H_2$ 23.1%, butene 15.5%, and at a temperature of 90° C. for 4 hours, with 528 g of white polyethylene being obtained. The product has a melt index $MI_{2.16}$ of 12.0 g/10 minutes, a density of 0.924 g/cm³ and a bulk density of 0.31 g/cm³. The polymerization efficiency is 4530 g polyethylene/g catalyst.

EXAMPLE 2

A. Silica carrier to be used in the catalyst according to the present invention is treated in a manner same as in Example 1.

B. Preparation of the Main Catalyst Component (1) The magnesium chloride in the nascent state is prepared in a manner same as in Example 1.

(2) Into a reaction vessel, 300 ml tetrahydrofuran, the solid magnesium chloride as prepared in the step (1), 6.6 ml of butyl titanate and 2.5 ml of titanium tetrachloride are charged and the resulting mixture is reacted at a temperature of 60° C. for 3 hours while stirring.

(3) The step is carried out in a manner same as in Example 1, except that the main catalyst component is not subjected to pre-activation.

C. Polymerization

The polymerization reaction is carried out in a fluidized bed having a diameter of 100 mm and a height of 1500 mm. First, 100 g of an oven-dried base of particulate polyethylene, 0.8 ml of triethyl aluminum as cocatalyst and 0.101 g of the main catalyst component as prepared above are charged into the fluidized bed reactor. The mixture is reacted at a total pressure of 1.0 MPa, with the composition of the feed gas being ethylene 79.3%, $H_2$ 20.7%, and at a temperature of 100° C. for 4 hours, with 433 g of white polyethylene being obtained. The product has a melt index $MI_{2.16}$ of 1.15 g/10 minutes, a density of 0.956 g/cm$^3$ and a bulk density of 0.34 g/cm$^3$. The polymerization efficiency is 4237 g polyethylene/g catalyst.

EXAMPLE 3

The procedure of Example 1 is followed except that the electron donor compound added in step (2) of the main catalyst component preparation is replaced with 2.34 g of ethyl benzoate. The results of polymerization is summarized in table 1.

EXAMPLE 4

The procedure of Example 1 is followed except that the electron donor compound added in step (2) of the main catalyst component preparation is replaced with 4.24 ml of tributyl phosphate. The results of polymerization is summarized in table 1.

EXAMPLE 5

The procedure of Example 1 is followed except that the electron donor compound added in step (2) of the main catalyst component preparation is replaced with 1.14 g of N,N-dimethylformamide. The results of polymerization is summarized in table 1.

EXAMPLE 6

The procedure of Example 1 is followed except that the amount of n-butyl chloride added in step (1) of the main catalyst component preparation is changed from 35 ml to 26 ml and the resulting magnesium chloride in the nascent state is represented by $MgCl_2(MgBuCl)_{0.5}$. The results of polymerization is summarized in table 1.

EXAMPLE 7

The procedure of Example 1 is followed except that the reaction temperature in step (1) of the main catalyst component preparation is changed from 40° C. to 35° C. and the resulting magnesium chloride in the nascent state is represented by $MgCl_2(MgBuCl)_{0.4}$. The results of polymerization is summarized in table 1.

EXAMPLE 8

The procedure of Example 1 is followed except that during the evaporation of tetrahydrofluran in step (3) of the main catalyst component preparation, the content of tetrahydrofuran in the main catalyst component is 20%. The results of polymerization is summarized in table 1.

EXAMPLE 9

The procedure of Example 1 is followed except that the silica carrier is treated at a temperature of 500° C. for 12 hours and after cooled, it is added into 500 ml n-hexane solution containing 6.3 ml of triethyl aluminum. The results of polymerization are summarized in table 1.

TABLE 1

| | Results of Polymerization | | | |
| | | Properties of Products | | |
| Example No. | Polymerization Efficiency, g PE/ g Cat. | Density, g/cm$^3$ | Melt Index $MI_{2.16}$, g/10 Min | Bulk Density, g/cm$^3$ |
| --- | --- | --- | --- | --- |
| 3 | 3556 | 0.921 | 21.3 | 0.375 |
| 4 | 3099 | 0.929 | 7.8 | 0.366 |
| 5 | 3444 | 0.931 | 20.9 | 0.350 |
| 6 | 4236 | 0.927 | 9.84 | 0.305 |
| 7 | 4072 | 0.928 | 4.1 | 0.328 |
| 8 | 3357 | 0.924 | 15.4 | 0.360 |
| 9 | 4709 | 0.925 | 12.0 | 0.347 |

EXAMPLE 10

A series of polymerization experiments are carried out in a manner same as Example 1 except that the composition of the feed gas are changed as indicated in Table 2 and the results are summarized in Table 2. In addition, the particle sizes of the resulting polymers are analyzed and the results are summarized in Table 3.

TABLE 2

| | Conditions for Polymerization | | | | Results of Polymerization | | | |
| Experiment No. | Pressure MPa | Temperature ° C. | Composition of the feed gas, % | | Polymerization Efficiency, g PE/g Cat. | Properties of Products | | |
| | | | $H_2$ | Ethylene | 1-Butene | | Density, g/cm$^3$ | $MI_{2.16}$, g/10 Min | Bulk Density, g/cm$^3$ |
| --- | --- | --- | --- | --- | --- | --- | --- | --- | --- |
| 1 | 1.0 | 95 | 50 | 50 | — | 2200 | 0.960 | 6.8 | 0.375 |
| 2 | 1.0 | 95 | 60 | 40 | — | 1980 | 0.958 | 9.7 | 0.372 |
| 3 | 1.0 | 90 | 50 | 25 | 25 | 2500 | 0.922 | 102 | 0.354 |
| 4 | 1.0 | 90 | 40 | 40 | 20 | 4000 | 0.921 | 67.5 | 0.352 |
| 5 | 1.0 | 90 | 30 | 50 | 20 | 4350 | 0.922 | 18.0 | 0.327 |
| 6 | 1.0 | 90 | 10 | 80 | 10 | 5020 | 0.938 | 3.9 | 0.331 |

TABLE 3

| Experiment No. | <20 mesh | 20–40 mesh | 40–75 mesh | 75–100 mesh | 100–200 mesh | >200 mesh |
|---|---|---|---|---|---|---|
| 1 | 28.8% | 59.6% | 10.2% | 1.0% | 0.3% | 0.1% |
| 2 | 26.4% | 63.0% | 9.6% | 0.8% | 0.1% | 0.1% |
| 3 | 51.0% | 42.0% | 6.5% | 0.3% | 0.1% | 0.1% |
| 4 | 36.4% | 49.5% | 11.6% | 1.5% | 0.7% | 0.2% |
| 5 | 32.6% | 53.5% | 13.2% | 0.1% | 0.5% | 0.2% |
| 6 | 33.3% | 45.0% | 19.25% | 1.9% | 0.3% | 0.3% |

What is claimed is:

1. A high activity solid catalyst for producing low-, medium- and high-density polyethylene by gas phase process, comprising A) a solid main catalyst component containing titanium, obtained by reacting powdered magnesium with an alkyl halide in a hydrocarbon solvent to form a magnesium halide in the nascent state, then reacting said magnesium halide with a titanium compound and an alkyl aluminum compound in the presence of an electron donor compound to form a complex and finally supporting the resulting complex onto silica carrier, wherein said electron donor compound is an organic compound containing at least one atom of oxygen, sulfur, nitrogen, silicon or phosphorus; and B) an organometallic compound as cocatalyst; wherein the ratio of the cocatalyst to the main catalyst component, in terms of the molar ratio of the metal contained in component B) to titanium contained in component A), is (30–300):1.

2. The high activity solid catalyst as claimed in claim 1, wherein said alkyl halide is represented by the formula RX and said magnesium halide in nascent state has a structure represented by the following formula:

$$(RMgX)_p(MgX_2)_q$$

wherein p:q is 0–1.0:1.0(by mole), R is an alkyl group containing from 3 to 12 carbon atoms and X is halogen.

3. The high activity solid catalyst as claimed in claim 2, wherein said alkyl halide is n-propyl chloride, n-butyl chloride, isobutyl chloride or isopentyl chloride and p:q is 0.05–0.8:1.0(by mole).

4. The high activity solid catalyst as claimed in claim 1, wherein said hydrocarbon solvent is an aliphatic hydrocarbon, a cycloaliphatic hydrocarbon or an aromatic hydrocarbon.

5. The high activity solid catalyst as claimed in claim 1, wherein said electron donor compound is diethyl ether, tetrahydrofuran, ethyl acetate, ethyl benzoate, tributyl phosphate, isobutanol, N, N-dimethylformamide or a mixture thereof.

6. The high activity solid catalyst as claimed in claim 1, wherein said titanium compound is a compound represented by the following formula:

$$Ti(OR")_mCl_{4-m}$$

wherein R" is an alkyl group containing 3 or 4 carbon atoms and m is an integer of from 0 to 4; and said alkyl aluminum compound is triethyl aluminum, triisopropyl aluminum, triisobutyl aluminum, tri-n-octyl aluminum, tri-(2-ethyl) hexyl aluminum, diethyl aluminum chloride, ethyl aluminum dichloride, diisopropyl aluminum chloride, ethyl aluminum sesquichloride or butyl aluminum sesquichloride.

7. The high activity solid catalyst as claimed in claim 6, wherein said titanium compound is titanium tetrachloride, butyl titanate, methoxy titanium trichloride or butoxy titanium trichloride.

8. The high activity solid catalyst as claimed in claim 1, wherein said cocatalyst is organic zinc compounds, organic magnesium compounds, organic aluminum compounds or the mixtures thereof.

9. A high activity solid catalyst as claimed in claim 8, wherein said cocatalyst is an organic aluminum compound selected from triethyl aluminum, diethyl aluminum chloride, triisobutyl aluminum, tri-n-hexyl aluminum or a mixture thereof.

10. A high activity solid catalyst as claimed in claim 1, wherein the molar ratio of the alkyl aluminum compound: the titanium compound: the magnesium halide in nascent state is (0.5–5.0):1:(2.0–10).

11. A high activity solid catalyst as claimed in claim 1, wherein said silica is treated by heating in a fluidized bed through which a carrier gas is passed, at a temperature of 500–800° C. for 2–12 hours and then cooled to room temperature for further reaction.

12. A high activity solid catalyst as claimed in claim 11, wherein said silica is treated at a temperature of 600–700° C. for 3–10 hours and said carrier gas passing through said fluidized bed is one of air, nitrogen or argon.

13. The high activity solid catalyst as claimed in claim 11, wherein said treated silica is mixed with a hydrocarbon solvent under stirring to form a slurry, to the slurry is added an alkyl aluminum compound in an amount of the weight ratio of aluminum contained in the alkyl aluminum compound to $SiO_2$ is 0.01–10:1, and then the mixture is stirred for 0.5 to 4 hours at room temperature, followed by the removal of the solvent by drying to form silica carrier having excellent fluidity.

14. The high activity solid catalyst as claimed in claim 13, wherein said alkyl aluminum compound is used in an amount of the weight ratio of aluminum contained in the alkyl aluminum compound to $SiO_2$ is 0.02–8:1; said alkyl aluminum compound is selected from the group consisting of triethyl aluminum, triisopropyl aluminum, triisobutylaluminum, tri-n-octyl aluminum and tri-(2-ethyl) hexyl aluminum and said hydrocarbon solvent is an aliphatic hydrocarbon, a cycloaliphatic hydrocarbon or an aromatic hydrocarbon.

15. The high activity solid catalyst as claimed in claim 1, wherein the content of said electron donor compound in said main catalyst component is from 2 to 30 percent by weight.

16. The high activity solid catalyst as claimed in claim 15, wherein the content of said electron donor compound in said main catalyst component is from 5 to 25 percent by weight.

17. The high activity solid catalyst as claimed in claim 1, wherein the composition of the main catalyst component is such that the molar ratio of Ti:Mg:X is 1:(2.0–10.0):(4.0–20).

18. The high activity solid catalyst as claimed in claim 9, wherein the cocatalyst is used in such an amount that the molar ratio of Al to Ti is (50–250):1.

19. The high activity solid catalyst as claimed in claim 4 or 14, wherein said hydrocarbon solvent is selected from the group consisting of n-pentane, isopentane, n-hexane, n-octane, cyclopentane, cyclohexane, benzene and 1,2-dichloroethane.

20. A process for preparing a high activity solid catalyst as claimed in claim 1, comprising the following steps: (1) silica is treated by heating in a fluidized bed through which a carrier gas is passed, at a temperature of 500–800° C. for 2–12 hours and then cooled to room temperature for further reaction; (2) under an atmosphere of nitrogen, powdered magnesium is reacted with an alkyl halide(RX) in a hydrocarbon solvent, at a temperature of 10–100° C., for 0.5–10 hours, to obtain a magnesium halide in the nascent state; (3) the magnesium halide in nascent state as prepared in the above (2) is reacted with a titanium compound and an alkyl aluminum compound in the presence of an electron donor compound at a temperature of 20–80° C. for 0.5–10 hours to form a complex, which is supported onto the silica carrier as prepared in the above (1) with stirring at a temperature of 20–80° C. for 0.5–8 hours, and then the electron donor compound as solvent is removed by drying at 75° C. to obtain a main catalyst component which contains the electron donor compound in an amount of 2 to 30% by weight of the main catalyst component and the composition of which is such that the molar ratio of Ti:Mg:X is 1:(2.0–10.0):(4.0–20); and (4) the main catalyst component as prepared in the above (3) is completely activated to form a high activity solid catalyst for direct use in the gas phase polymerization of ethylene, wherein the molar ratio of the metal atom contained in the cocatalyst to titanium contained in the main catalyst component is 30–300:1.

21. The process as claimed in claim 20, wherein said treated silica is mixed with a hydrocarbon solvent under stirring to form a slurry; to the slurry is added an alkyl aluminum compound such that the weight ratio of aluminum contained in the alkyl aluminum compound to $SiO_2$ is 0.1–10:1, and then the mixture is stirred for 0.5 to 4 hours at room temperature; the solvent is removed by drying to form silica carrier having excellent fluidity.

22. The process as claimed in claim 20, wherein prior to complete activation, the main catalyst component is pre-activated by a portion of cocatalyst and then is charged into the fluidized bed together with the remainder of the cocatalyst; upon pre-activation, the cocatalyst is used in such an amount that the molar ratio of the metal atom contained in the cocatalyst to titanium contained in the main catalyst component is 1–10:1, and the pre-activation is carried out by stirring the mixture at a temperature of 20–100° C. for 0.5–2 hours.

23. A process for gas phase polymerizing ethylene, wherein ethylene, alone or together with other olefins, is polymerized in the presence of the high activity solid catalyst as claimed in claim 1.

* * * * *

UNITED STATES PATENT AND TRADEMARK OFFICE
CERTIFICATE OF CORRECTION

PATENT NO. : 6,303,716 B1
DATED : October 16, 2001
INVENTOR(S) : Xiao et al.

It is certified that error appears in the above-identified patent and that said Letters Patent is hereby corrected as shown below:

<u>Title page,</u>
Item [73], the Assignees' information should read:

[73] Assignees: China Petrochemical Corporation, Beijing; Shanghai Research Institute of Chemical Industry SINOPEC UNILAB Shanghai Reasearch Center of Organic Chemistry, Shanghai, both of (CN)

Signed and Sealed this

Eleventh Day of June, 2002

*Attest:*

JAMES E. ROGAN
*Attesting Officer*   *Director of the United States Patent and Trademark Office*